April 29, 1958 R. L. CROWE 2,832,380
SAW CHAIN
Filed Dec. 1, 1955 2 Sheets-Sheet 1
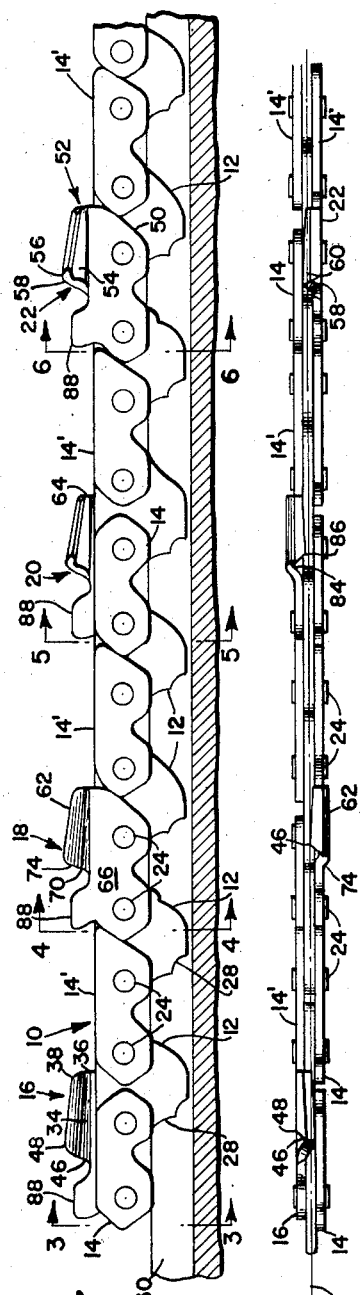
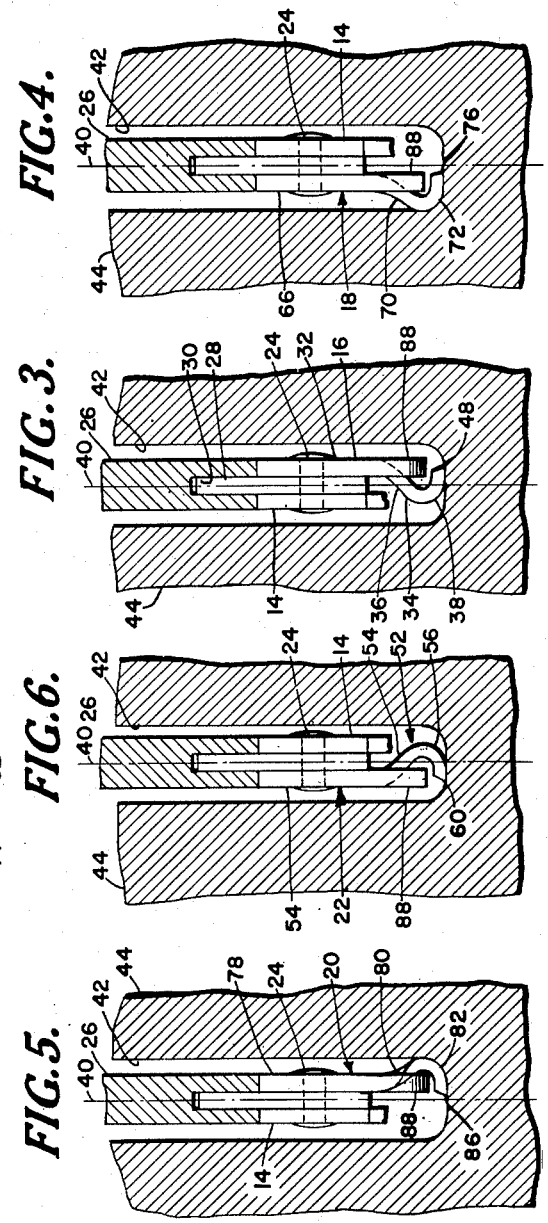
INVENTOR
ROGER L. CROWE
BY *Cushman, Darby & Cushman*
ATTORNEY April 29, 1958
R. L. CROWE
2,832,380
SAW CHAIN
Filed Dec. 1, 1955
2 Sheets-Sheet 2
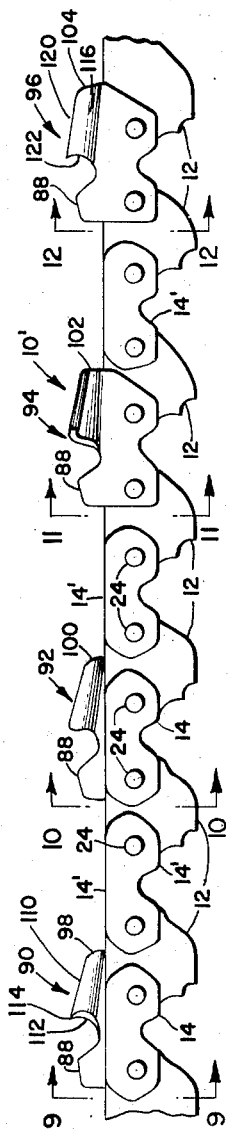
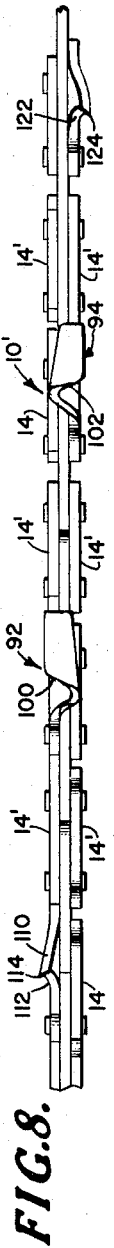
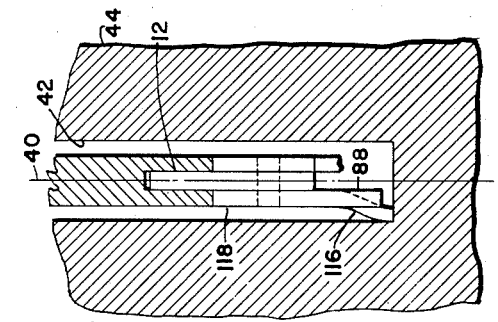
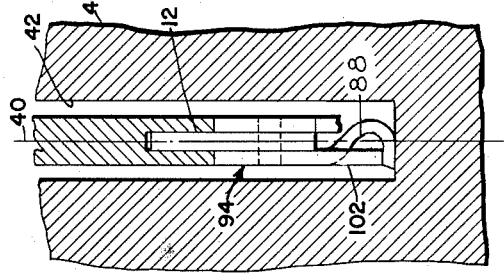
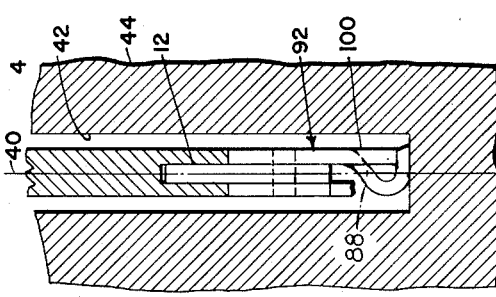
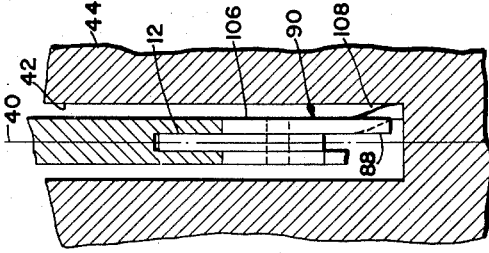
INVENTOR
ROGER L. CROWE
BY Cushman, Darby & Cushman
ATTORNEY United States Patent Office 2,832,380
Patented Apr. 29, 1958

2,832,380

SAW CHAIN

Roger L. Crowe, Dunn, N. C.

Application December 1, 1955, Serial No. 550,432

7 Claims. (Cl. 143—135)

The present invention relates to improvement in saw chains of the type for use with portable power saws and, more particularly, saw chains movable in an endless orbital path.

In cutting wood, for example, felling of trees, bucking logs, and various other sawing operations, power saws have been designed utilizing a continuous belt of pivotally connected links having cutting teeth thereon. The cutting teeth are so spaced on the saw chain as to cut opposite side walls and the bottom of a kerf. Heretofore the cutting teeth of the chain usually comprised a series of oppositely disposed teeth, alternate teeth being adapted to cut one side wall of the kerf and at least half of the kerf bottom. Auxiliary teeth, such as rakers which do no cutting, were sometimes provided to remove the material cut by the cutting teeth, the rakers being disposed longitudinally of each other but between the cutting teeth. The cutting teeth of prior saw chains were required to take a considerable bite out of the wood and, in most instances, at least one-half of the kerf. The cutting teeth of such saw chains had a gouging and tearing action leaving a kerf with rough side walls and bottom. The gouging and tearing action of the cutting teeth not only produced an unsatisfactory kerf but also resulted in jumping and binding of the saw chain, as well as premature dulling of the cutting teeth. Another disadvantage of prior saw chains was the inability of the saw chain to maintain a straight cut. In other words, since the cutting teeth took such a large bite of the wood, there was a side pull by the teeth resulting in a side load on the chain, causing the chain to wear the drive sprocket and guide walls of the saw bar. Further, such uneven pull on the chain by the cutting teeth required greater effort by the operator of the portable saw to control the same.

Therefore, an object of the present invention is to provide a saw chain having cutting teeth thereon, the saw chain being so designed as to result in efficient operation of the power saw in quickly producing a smooth kerf.

An object of the present invention is to provide a saw chain wherein the cutting teeth are so arranged as to take a minimum bite, thereby eliminating binding, jumping and/or instability of the saw chain.

Still another object of the present invention is to provide a saw chain having groups of cutting teeth, each of the groups of cutting teeth being so arranged as to have teeth for cutting the kerf side walls and a portion of the kerf bottom and teeth for cutting the remaining portion of the kerf bottom. Each of the teeth for cutting the remaining portion of the kerf bottom not previously cut by the kerf side wall cutting teeth are so designed as to cut slightly more than one-half of the remaining portion of the kerf bottom.

A still further object of the present invention is to provide a saw chain which will require less motor effort to drive the same while doing a maximum amount of cutting.

Another object of the present invention is to provide a saw chain having cutting teeth thereon so arranged as to counterbalance the tendency of the cutting teeth to pull the chain from its straight line orbital path. By counterbalancing the drag of the cutting teeth on the chain, unnecessary wear of the saw and its parts is eliminated.

Still another object of the present invention is to provide a saw chain having cutting teeth thereon which will automatically tend to eliminate side loads on the chain, thereby providing a straight line cutting action and easier operation of the saw.

A still further object of the present invention is to provide a saw chain which will require less manual effort on the part of the operator in guiding the saw when performing various sawing operations.

A further object of the present invention is to provide a new and improved saw chain which may be manufactured inexpensively and which will require a minimum of maintenance during the life of the saw chain.

A still further object of the present invention is to provide a saw chain having cutting teeth arranged thereon in such a manner that should the teeth be misfiled when resharpening, they still will not materially affect the balance and stability of the saw chain.

Still another object of the present invention is to provide a saw chain having cutting teeth thereon so arranged to progressively cut a kerf, for example, to cut first a portion of the bottom of the kerf, then one side wall and another portion of the bottom of the kerf and finally the other side wall and the remaining portion of the bottom of the kerf.

A still further object of the present invention is to provide a saw chain which may be used for a rip, diagonal or cross cut, and even a plunge cut, i. e., boring through a large log and then cutting downwardly and upwardly through the log, the cutting teeth of the chain being so designed and arranged as to cut either hard or soft wood.

These and other objects of the present invention will appear more fully in the following specification, claims and drawings in which:

Figure 1 is a side elevational view showing a portion of the saw chain constructed in accordance with the present invention;

Figure 2 is a top plan view of the portion of the saw chain disclosed in Figure 1;

Figure 3 is a vertical cross-sectional view taken on the line 3—3 of Figure 1 but showing the tooth in cutting position in a kerf;

Figure 4 is a vertical cross-sectional view taken on the line 4—4 of Figure 1 but showing the tooth in cutting position in a kerf;

Figure 5 is a vertical cross-sectional view taken on the line 5—5 of Figure 1 but showing the tooth in cutting position in a kerf;

Figure 6 is a vertical cross-sectional view taken on the line 6—6 of Figure 1 but showing the tooth in cutting position in a kerf;

Figure 7 is a side elevational view showing a modified version of a portion of the saw chain constructed in accordance with the present invention;

Figure 8 is a top plan view of the modified saw chain disclosed in Figure 7;

Figure 9 is a vertical sectional view taken on the line 9—9 of Figure 7 but showing the cutting tooth in sawing position in the kerf;

Figure 10 is a vertical sectional view taken on the line 10—10 of Figure 7 but showing the cutting tooth in sawing position in the kerf;

Figure 11 is a vertical sectional view taken on the line 11—11 of Figure 7 but showing the cutting tooth in sawing position in the kerf;

Figure 12 is a vertical sectional view taken on the line 12—12 of Figure 7 but showing the cutting tooth in sawing position in the kerf.

Referring now to the accompanying drawings wherein like character or reference numerals represent like or similar parts, a portion of a saw chain generally indicated by the numeral 10 of the present invention is disclosed in Figure 1. The saw chain 10 is of the endless belt type and is constructed of a plurality of drive links 12 which are pivotally connected together by side links 14, 14', 16, 18, 20 and 22. The side links 16, 18, 20 and 22 are provided with cutting teeth for progressively cutting a kerf, as will be explained in more detail later in the specification. For present purposes, it will be sufficient to say that pairs of oppositely disposed side links are pivotally connected to and between the drive links 12 by means of rivets 24 which extend through the side links and the center drive link, as best disclosed in Figures 2 and 3.

The endless belt or chain is supported on a conventional saw bar 26, a portion of which is shown, which forms a part of a conventional power-driven chain-type saw. Each of the drive links 12 is provided with a flat plate-like tab or wing 28 which is adapted to ride in a groove or guide 30 provided on the peripheral edge of saw bar or guide plate 26. The tabs 28 of drive links 12 engage a conventional drive sprocket mounted on and coupled to the saw motor (not shown) and are driven thereby so that the endless chain 10 travels on an endless orbital path in one direction.

As heretofore mentioned, some of the side links such as the side links 16, 18, 20 and 22 are provided with cutting teeth for cutting a kerf. In more detail, the side links 16, 18, 20 and 22 are so arranged as to provide a tooth group for cutting progressively the center portion of the kerf as well as the side walls of the kerf. A plurality of tooth groups such as mentioned above would be provided on the endless chain, the arrangement of the cutting teeth in the tooth groups embodying the principles of the present invention.

Referring first to Figures 1 and 3, it will be noted that the side link 16 includes a body portion 32 and a tooth portion 34. The tooth portion comprises a shank portion 36 and a toe portion 38. Shank portion 36 is integral with and extends outwardly from body portion 32 and across a median plane 40 of the chain 10 or a kerf 42 which is being cut in the wood 44. Toe portion 38 extends from the outer end of shank 36 and is reversely curved back across median plane 40 to a position terminating short of the kerf side wall. Tooth 34 is provided with a chisel-shaped cutting edge 46 extending along a portion of the shank 36 and continuing along toe 38. The cutting edge 46 terminates in a point 48 which is directed away from the median plane 40 and is positioned on the same side of the median plane 40 as the body 32 of side link 16.

As best shown in Figure 3, the side link 16 cuts the bottom of kerf 42 from a point to the left of median plane 40 to a point short of the side wall of the kerf. Because of the arrangement of the cutting tooth having its shank portion extending across the median plane and a toe portion reversing back across the median plane, the cutting load of the tooth on the link is toward the center of the chain and, thus, does not tend to pull the chain to the right of Figure 3 and against the side of the slot 30 of bar 26.

Referring now to Figures 1 and 6, it will be noted that the side link 22 is substantially similar to the side link 16 except that it is mounted on the opposite side of the median plane 40 of chain 10 and is of oppositely or left configuration. In other words, side link 22 is comprised of a body portion 50 and a tooth portion 52 having a shank 54 and a toe 56. Shank 54 extends outwardly from body portion 50 across the median plane 40 in an opposite direction from the shank 36 of link 16. On the other hand, toe 56 extends from the outer edge of shank 54 and is reversely curved back across median plane 40 in an opposite direction from toe 38 of link 16. Link 22 is provided with a similar-shaped chisel cutting edge 58 which covers the toe 56 and a portion of the shank 54. Cutting edge 58 terminates in a point 60 which is oppositely disposed from the cutting point 48 of side link 16 and which terminates short of the opposite side wall of kerf 42. The cutting action of the tooth of side link 22 is identical with the cutting action of the tooth of side link 16 except that its pull is the reverse of the tooth of side link 16. In other words, the side force of the cutting link 22 will be toward the median plane 40 but in this instance from the left rather than from the right, as shown in Figures 6 and 3 respectively and, thus, the forces of the cutting teeth of links 16 and 22 are completely balanced.

Interposed between side links 16 and 22, which cut the center portion of the kerf bottom, is a pair of longitudinally spaced kerf side wall cutting teeth 62 and 64 carried by the side links 18 and 20, respectively. The cutting teeth 62 and 64 are so arranged as to cut the side wall of the kerf as well as a portion of the bottom of the kerf; however, it will be noted that the bottom portion of the kerf cut by these teeth terminates short of the median plane 40 of chain 10 as the previously mentioned teeth of side links 16 and 22 cut the center portion of the bottom of the kerf.

In more detail and as best shown in Figure 4, side link 18 is similar in configuration to side link 16, but is positioned on the opposite side of the median plane 40 of chain 10. Side link 18 includes a body portion 66 from which the tooth portion 62 extends outwardly therefrom. The tooth portion 62 includes a shank 70 and a toe portion 72. Shank 70 extends outwardly from body 66 and diverges away from the median plane 40 of chain 10. Toe portion 72 extends from the outer end of shank 70 curved inwardly toward median plane 40 but terminates short of the median plane. A cutting edge 74 is provided on a portion of shank 70 and the toe 72, the cutting edge terminating in a point 76, which, as previously mentioned, is short of median plane 40.

The tooth 62 of side link 18 cuts the kerf side wall and a portion of the kerf bottom, the portion of the kerf bottom slightly overlapping the area of the portion cut by the tooth 52 of side link 22. Since the tooth 62 of side link 18 cuts only the side wall and a small portion of the bottom of the kerf, there is very little drag on the chain 10 by the cutting action of the tooth and, consequently, the cut will be smooth as there is no jumping or binding as would be caused by a large bite.

As best shown in Figures 1, 2 and 5, side link 20 is similar to side link 18 and serves the same purpose in that it cuts the opposite kerf side wall and a portion of the kerf bottom. It will be noted that side link 20 includes a body 78 from which the tooth 64 extends. Tooth 64 is similar to tooth 62 but is of left-hand configuration in that it includes a shank portion 80 extending outwardly from body 78 which diverges to the right of Figure 5 away from the median plane, and a toe portion 82 extending from the outer edge of shank 80 curved back toward but terminating short of the median plane. Shank portion 80 and toe portion 82 are provided with a cutting edge 84 which terminates in a point 86 extending toward the median plane 40.

The cutting action of the teeth of side links 18 and 20 is similar and the pull of these side links is counterbalanced since they are oppositely disposed and of opposite configuration. However, since the teeth of side links 18 and 20 take but a small bite, tearing or gouging of the side walls is eliminated and, thus, the tendency of a side pull on the teeth is decreased. In this respect, it will be noted that when the teeth 62 and 64 are sharpened, they need not be as accurately filed to a specific angle as was required in prior teeth of this type. Since the cutting portion of this pair of teeth takes a very small bite of the wood, there is no chance of materially increasing the pull of the chain unduly toward one side or the other of the guide if an accurate angle of the chisel edge is not maintained. This feature of the invention eliminates one of the causes resulting in jumping or binding of the chain in the guide.

Each of the side links 16, 18, 20 and 22 is provided with an outwardly extending depth gauge 88, the depth gauge being positioned immediately in front of the teeth of the respective side links. The depth gauge 88, which is integral with the side links, determines the depth of the cut of the teeth of the side links and, thus, prevents too deep a bite into the wood which would normally result in rough operation of the saw chain.

Side links 14' or drive links 12 positioned longitudinally between each of the side links 16, 18, 20 and 22 may be considered as spacer links between the longitudinally positioned cutting teeth. Any number of spacer links 14' may be utilized depending on the length of the chain and how far apart it is desired to position the cutting teeth in each tooth group.

In a brief summation of the above, it will be noted that a plurality of tooth groups comprising the tooth links 16, 18, 20 and 22 are provided on the endless chain 10. Each of the tooth groups includes the first pair of links 16 and 22 for cutting the center bottom portion of the kerf as previously described, whereas the second pair of links 18 and 20 is provided for cutting the side walls of the kerf as well as the kerf bottom inwardly from the side wall to a position overlapping the cutting area of the first mentioned pair of links. The kerf is progressively cut in that first the side walls and a portion of the bottom is cut by one pair of links, whereas the center of the kerf bottom is cut by the other pair of links. It will be noted that in each pair of links, the individual links are spaced longitudinally so that even during the two stages of cutting, there is still progressive cutting of the kerf. Since the bite of each individual tooth of the side links having cutting teeth is small, tearing or gouging of the wood is eliminated and, consequently, there is no binding or jumping of the chain. Further, it will be noted that the teeth of the side links 16 and 22 for cutting the center of the kerf bottom are so arranged and designed that the pull of the teeth is toward the median plane of the chain and, thus, no center portion is left in the kerf and the chain is balanced in its endless orbital path.

Referring now to Figures 7 through 12, inclusive, a modification of the saw chain of the present invention is disclosed. The modified saw chain is substantially similar to the saw chain just previously described. However, the side links having cutting teeth thereon for cutting the kerf side wall and a portion of the kerf bottom differ materially in configuration. The elements of the modified saw chain which are substantially the same as the elements of the saw chain just previously described will be given the same numerals or reference characters. The detailed description of these elements will not be repeated hereinafter, as the foregoing description will suffice.

The modified saw chain is generally designated 10' and is of the endless belt type constructed of a plurality of drive links 12 pivotally connected together by side links 14, 14', 90, 92, 94 and 96. The links 90, 92, 94 and 96 contain cutting teeth 98, 100, 102 and 104 respectively for progressively cutting the kerf. It will be noted that the cutting teeth 100 and 102 of the links 92 and 94 are identical to the teeth 34 and 52 of the links 16 and 22 respectively of the first form of the present invention. In other words, the teeth 100 and 102 are substantially identical to the teeth 34 and 52 and are of right and left configuration, these teeth being utilized to make the center cut of the kerf bottom. The forces of the center kerf bottom cutting teeth on the chain are identical with those previously described with references to the corresponding teeth in the first form of the present invention and are toward the median plane of the chain.

Teeth 98 and 104 of links 90 and 96 perform the same function as the teeth 62 and 64 of the links 18 and 20 respectively in that they cut the kerf side wall and a portion of the kerf bottom not cut by the teeth 100 and 102.

The tooth 98 of link 90 includes a body portion 106 and a flat blade portion 108 which extends outwardly from body portion 106 and diverges away from the median plane 40 of the saw chain, as shown in Figure 9. The flat blade portion 108 terminates in a longitudinal edge 110 which is of rearwardly decreasing height, the forward portion of the blade having a chisel shaped cutting edge 112 thereon which terminates in a point 114 extending toward the side wall of the kerf. As best shown in Figure 9, tooth 98 cuts the side wall and a portion of the kerf bottom extending toward, but terminating short of median plane 40. The width of the cut of tooth 98 is determined by the thickness of the flat blade portion 108. This cut will slightly overlap the cut of tooth 100, the tooth 100 cutting from the other side of median plane 40 toward the side wall.

The tooth 104 of side link 96 is substantially similar to the tooth 98 but is of opposite or left-hand configuration. It includes a flat blade portion 116 extending outwardly from a body portion 118 and diverging away from median plane 40, as shown in Figure 12. Blade portion 116 terminates in a longitudinal edge 120 of rearwardly decreasing height, the forward edge of blade 116 forming a chisel-shaped cutting edge 122 terminating in a point 124. Like the tooth 98, the tooth 104 cuts a side wall of the kerf and a portion of the kerf bottom terminating short of the median plane of the saw chain.

The cutting action of the tooth groups of modified saw chain 10' disclosed in Figures 7 to 12, inclusive, is substantially similar to the cutting action of the tooth groups disclosed in Figures 1 to 6 inclusive and will not be further repeated. It will suffice to say that both tooth groups progressively cut the kerf by untilizing small overlapping cutting areas and that the cutting teeth for cutting the center portion of he kerf botom are so designed and consructed as to give a reverse cutting action. In other words, the cutting teeth for cutting the center of the kerf bottom are so arranged that the load applied to the chain by the cutting action is toward the center of the chain rather than toward the outside wall of the kerf and, consequently, the saw chain is perfectly balanced and requires less load on the saw motor (not shown).

It might be further added that each of the links having cutting teeth thereon in the modified form of the invention are also provided with depth gauges 88 just forward of the cutting teeth, the depth gauges limiting the depth of cut.

Arrangement of the longitudinal position of the individual teeth of the tooth groups with respect to each other may be varied in either form of the invention. However, regardless of the longitudinal position of the teeth with respect to each other within a tooth group, each tooth group must have at least two pairs of teeth, the individual teeth of a pair cutting a specific portion of the kerf as previously mentioned.

The terminology used in this specification is for the purpose of description and not for limitation, the scope of the invention being defined in the claims.

I claim:

1. In a saw chain, a plurality of links adapted to be connected for movement in an endless orbital path, some of said links having cutting teeth thereon and being assembled to form a plurality of tooth groups for progressively cutting a kerf: each of said groups comprising at least first and second pairs of links each including a body and a tooth; the teeth of said links of each pair being substantially identical but respectively of right and left configuration; each tooth of said first pair of links having a shank portion extending outwardly from the link body and diverging away from a median plane of the saw chain, and a toe portion extending from the outer end of said shank portion and reversely curved back toward but terminating short of said median plane, a cutting edge being provided on at least a portion of the shank and toe portions of said teeth for cutting a kerf side wall and a portion of the kerf bottom; each tooth of said second pair of links having a shank portion extending outwardly from the link body across said medium plane and then diverging away from said median plane, and a toe portion extending from the outer end of said shank portion and reversely curved back across said median plane to terminate short of the kerf side wall cutting portion of the oppositely configurated tooth on said first pair of links, the teeth on each of said second pair of links each having a cutting edge on at least the forward edge of its toe portion for cutting the kerf bottom from a point within the toe portion area of a tooth of said first pair of links to a point on the opposite side of said median plane.

2. A saw chain of the character described in claim 1 wherein the links having teeth thereon are spaced from one another by spacer links and wherein said first pair of links is positioned longitudinally between the links of said second pair.

3. In a saw chain adapted for movement in an endless orbital path: a plurality of longitudinally spaced drive links; oppositely disposed side links pivotally joining together each of said drive links; some of said side links having cutting teeth formed thereon, the side links with the cutting teeth formed thereon being arranged to form a plurality of tooth groups for progressively cutting a kerf; each of said tooth groups comprising at least first and second pairs of side links, each of said side links including a body portion and a tooth portion; the cutting teeth of said first pair of side links being substantially identical but respectively of right and left configuration and positioned on opposite sides of a median plane of the saw chain; each tooth of said first pair of side links having a cutting edge formed of a portion to cut a kerf side wall and a portion to cut an area of the kerf bottom; the cutting teeth of said second pair of side links being substantialy identical but respectively of right and left configuration; each tooth of said second pair of side links having a shank portion extending outwardly from the side link body completely on one side of the median plane and then converging toward and completely across and then diverging away from the median plane of the saw chain, and a toe portion which extends from the outer end of the shank portion and then reversely back toward and completely across said median plane and terminating short of the kerf side wall cutting portion of the oppositely configurated tooth on said first pair of side links, the teeth on said second pair of side links each having a cutting edge on at least the forward edge of its toe portion for cutting the kerf bottom from a point within the cutting area of a tooth of said first pair of links to a point on the opposite side of said median plane.

4. A saw chain of the character described in claim 3 wherein the side links having teeth thereon are spaced longitudinally from one another and wherein the links of said first pair are positioned longitudinally from each other and between the links of said second pair.

5. A saw chain of the character described in claim 3, wherein said first pair of side links each include a substantially flat blade portion extending outwardly from the link body portion and diverging away from the median plane of the saw chain, the blade portion terminating in a longitudinal edge of rearwardly decreasing height and having a forward cutting edge formed thereon.

6. A saw chain of the character described in claim 5, wherein the side links having teeth thereon are spaced longitudinally from one another and wherein the links of said first pair of links are positioned longitudinally from each other and between the links of said second pair.

7. In a saw chain adapted for movement in an endless orbital path: a plurality of longitudinally spaced drive links; oppositely disposed side links pivotally joining together each of said drive links; some of said side links having cutting teeth formed thereon, the side links with the cutting teeth formed thereon being arranged to form a plurality of tooth groups for progressively cutting a kerf; each of said tooth groups comprising at least first and second pairs of side links, each including a body portion and a tooth portion; the cutting teeth of said first pair of side links being substantially identical but respectively of right and left configuration and positioned on opposite sides of a median plane of the saw chain; each tooth of said first pair of links having a shank portion extending outwardly from the link body and diverging away from the median plane of the saw chain, and a toe portion extending from the outer end of the shank portion and reversely curved back toward but terminating short of said median plane, a cutting edge being provided on at least a portion of the shank and toe portions of said teeth for cutting a kerf wall and a portion of the kerf bottom; the cutting teeth of said second pair of side links being substantially identical but respectively of right and left configuration; each tooth of said second pair of side links having a shank portion extending outwardly from the side link body and across the median plane of the saw chain, and a toe portion which extends from the outer end of the shank portion and reversely back across said median plane and terminating short of the kerf side wall cutting portion of the oppositely configurated tooth on said first pair of side links, the teeth on said second pair of side links each having a cutting edge on at least the forward edge of its toe portion for cutting the kerf bottom from a point within the toe porion area of a tooth of said first pair of links to a point on the opposite side of said median plane.

References Cited in the file of this patent

UNITED STATES PATENTS

| 2,508,784 | Cox | May 23, 1950 |
| 2,565,502 | Johanson | Aug. 28, 1951 |

FOREIGN PATENTS

| 913,955 | Germany | June 24, 1954 |